United States Patent
Khan et al.

(10) Patent No.: US 10,845,454 B2
(45) Date of Patent: Nov. 24, 2020

(54) CHECKING THE HEALTH OF RADIO MODEL DATA

(71) Applicant: HERE GLOBAL B.V., Eindhoven (NL)

(72) Inventors: Muhammad Irshan Khan, Tampere (FI); Pavel Ivanov, Tampere (FI); Jari Syrjärinne, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 119 days.

(21) Appl. No.: 15/536,993

(22) PCT Filed: Dec. 18, 2014

(86) PCT No.: PCT/EP2014/078420
§ 371 (c)(1),
(2) Date: Jun. 16, 2017

(87) PCT Pub. No.: WO2016/096010
PCT Pub. Date: Jun. 23, 2016

(65) Prior Publication Data
US 2017/0343640 A1    Nov. 30, 2017

(51) Int. Cl.
*G01S 5/02*    (2010.01)

(52) U.S. Cl.
CPC ............ *G01S 5/0252* (2013.01); *G01S 5/021* (2013.01)

(58) Field of Classification Search
CPC .............................. G01S 5/0252; G01S 5/021
See application file for complete search history.

(56) References Cited

U.S. PATENT DOCUMENTS

| | | |
|---|---|---|
| 8,504,288 B2 | 8/2013 | Kadous et al. |
| 8,538,457 B2 | 9/2013 | Morgan et al. |

(Continued)

FOREIGN PATENT DOCUMENTS

| | | |
|---|---|---|
| CN | 1741415 A | 3/2006 |
| CN | 101877820 A | 11/2010 |

(Continued)

OTHER PUBLICATIONS

Eisa, S. et al., *Removing Useless APs and Fingerprints from WiFi Indoor Positioning Radio Maps*, 2013 International Conference on Indoor Positioning and Indoor Navigation (Oct. 2013) 7 pages.

(Continued)

*Primary Examiner* — Zhitong Chen
(74) *Attorney, Agent, or Firm* — Alston & Bird LLP

(57) ABSTRACT

An apparatus obtains results of measurements, which are performed by a mobile device on signals of communication nodes. The measurement results for each of the communication nodes include a signal strength related value and an identification of the communication node. The apparatus obtains for one of the communication nodes a stored indication of a location and a stored signal strength related value and determines a difference between measured and stored signal strength related values. The apparatus estimates the position of the mobile device based on the results of measurements and on obtained stored radio model data. In the case that the determined difference for the at least one communication node falls short of a predetermined threshold, the apparatus determines a distance between estimated position and indicated location for the at least one communication node, as an indication of a health state of stored radio model data.

21 Claims, 8 Drawing Sheets

(56) References Cited

U.S. PATENT DOCUMENTS

| | | | |
|---|---|---|---|
| 8,688,396 | B2 | 4/2014 | Lin et al. |
| 2006/0046646 | A1 | 3/2006 | Couper |
| 2006/0095348 | A1 | 5/2006 | Jones et al. |
| 2008/0176583 | A1 | 7/2008 | Brachet et al. |
| 2008/0299993 | A1 | 12/2008 | Gordon et al. |
| 2011/0201347 | A1 | 8/2011 | Abraham et al. |
| 2011/0306361 | A1 | 12/2011 | Alizadeh-Shabdiz et al. |
| 2011/0319097 | A1 | 12/2011 | Wirola et al. |
| 2012/0021768 | A1 | 1/2012 | Rudland et al. |
| 2012/0280866 | A1* | 11/2012 | Alizadeh-Shabdiz ........ G01S 5/0226 342/463 |
| 2013/0072227 | A1* | 3/2013 | Morgan .............. G01S 5/02 455/456.1 |
| 2013/0260771 | A1 | 10/2013 | Wirola et al. |
| 2013/0342400 | A1 | 12/2013 | Meyer et al. |
| 2014/0011518 | A1 | 1/2014 | Valaee et al. |
| 2015/0230100 | A1* | 8/2015 | Atia ............... H04W 16/18 370/252 |
| 2016/0161592 | A1 | 6/2016 | Wirola et al. |

FOREIGN PATENT DOCUMENTS

| | | |
|---|---|---|
| CN | 101953197 A | 1/2011 |
| CN | 101980550 A | 2/2011 |
| CN | 102164339 A | 8/2011 |
| CN | 103120000 A | 5/2013 |
| CN | 103874118 | 6/2014 |
| CN | 104093202 A | 10/2014 |
| WO | WO 2013/000073 A1 | 1/2013 |
| WO | WO 2016/086993 | 6/2016 |
| WO | WO 2016/086994 | 6/2016 |

OTHER PUBLICATIONS

International Search Report and Written Opinion for corresponding International Application No. PCT/EP2014/078420, dated Sep. 14, 2015, 9 pages.

Lo, C.C. et al., *Adaptive radio maps for pattern-matching localization via inter-beacon co-calibration*, Pervasive and Mobile Computing, Elsevier (2012) 10 pages.

Nurminen, H. et al., *Statistical Path Loss Parameter Estimation and Positioning Using RSS Measurements in Indoor Wireless Networks*, in 2012 IEEE, International Conference on Indoor Positioning and Indoor Navigation (Nov. 2012) 9 pages.

Zhang, D. et al., *Crowdsourcing Based Radio Map Anomalous Event Detection System for Calibration-on-demand*, 2014 International Conference on Indoor Positioning and Indoor Navigation, (Oct. 2014) 10 pages.

Office Action for European Application No. 14820832.5 dated Dec. 12, 2018.

Office Action for Chinese Application No. 201480084668.7 dated Aug. 27, 2019, 20 pages.

Office Action for European Application No. 14820832.5 dated Aug. 18, 2020, 5 pages.

\* cited by examiner

CHECKING THE HEALTH OF RADIO MODEL DATA

FIELD OF THE DISCLOSURE

The invention relates to the field of positioning and more specifically to checking the health of radio model data that is used for positioning mobile devices.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BTLE) based positioning solutions, and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner Collected fingerprint data may be uploaded to a database in a server or in the cloud, where algorithms may be run to generate models of WLAN access points for positioning purposes.

In the positioning stage, a mobile device may estimate its current location based on own measurements taken from the radio interface and on the data or a subset of data that is available from the training stage. Models or parts of models that have been generated in the training stage may be transferred to mobile devices for use in position determination. Alternatively, the models may be stored in a positioning server to which the mobile devices may connect to for obtaining position information.

A similar approach could be used for a positioning that is based on other types of terrestrial communication nodes or on a combination of different types of terrestrial communication nodes.

SUMMARY OF SOME EMBODIMENTS OF THE INVENTION

An example embodiment of a method according to the invention comprises, performed by at least one apparatus, obtaining results of measurements for a plurality of communication nodes, the measurements performed by a mobile device at a particular position on signals of the communication nodes and the measurement results for each of the communication nodes including at least a signal strength related value and an identification of the communication node. The method further comprises obtaining for at least one of the plurality of communication nodes a stored indication of a location and a stored signal strength related value associated with the stored indication of a location, and determining for the at least one communication node a difference between the signal strength related value included in the results of measurements for the at least one communication node and the stored signal strength related value obtained for the at least one communication node. The method further comprises obtaining for at least a part of the plurality of communication nodes stored radio model data, and estimating the particular position of the mobile device based on the obtained results of measurements for at least a part of the plurality of communication nodes and on the obtained stored radio model data. The method further comprises determining a distance between the estimated particular position and a location indicated by the obtained stored indication of a location for the at least one communication node, as an indication of a health state of stored radio model data, in the case that the determined difference between the signal strength related value included in the results of measurements for the at least one communication node and the stored signal strength related value obtained for the at least one communication node falls short of a predetermined threshold.

An example embodiment of a first apparatus according to the invention comprises means for performing the actions of any embodiment of the presented example method.

The means of the first apparatus may be implemented in hardware and/or software. They may comprise for instance a processor for executing computer program code for realizing the required functions, a memory storing the program code, or both. Alternatively, they may comprise for instance a circuit that is designed to realize the required functions, for instance implemented in a chipset or a chip, like an integrated circuit.

An example embodiment of a second apparatus according to the invention comprises at least one processor and at least one memory including computer program code, the at least one memory and the computer program code configured to, with the at least one processor, cause the apparatus at least to perform the actions of any embodiment of the presented example method.

Any of the described apparatuses may comprise only the indicated components or one or more additional components.

Moreover an example embodiment of a system is presented, which comprises any embodiment of any presented example apparatus. The apparatus is one of the mobile device and a server. The system further comprises a server, in case the apparatus is the mobile device; and the system further comprises the mobile device, in case the apparatus is a server. Optionally, the system may further comprise various other components.

Moreover an example embodiment of a non-transitory computer readable storage medium is presented, in which computer program code is stored. The computer program code causes an apparatus to perform the actions of any embodiment of the presented example method when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for checking the health of radio model data. In certain embodiment, any of the presented first apparatuses is an apparatus for checking the health of radio model data.

It is to be understood that any feature presented for a particular exemplary embodiment may also be used in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
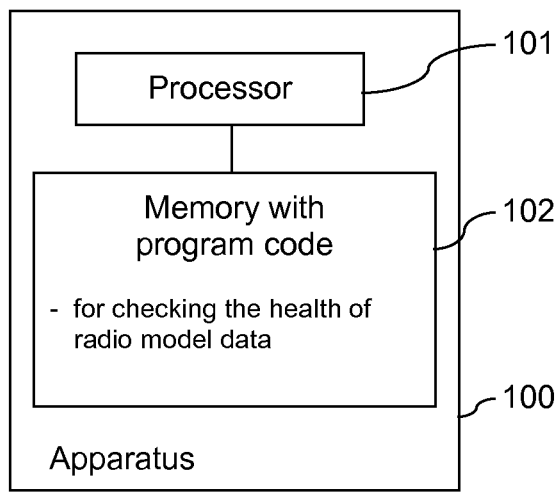
FIG. 1 is a schematic block diagram of an example embodiment of an apparatus.

FIG. 1 is a schematic block diagram of an example embodiment of an apparatus 100 according to the invention. Apparatus 100 comprises a processor 101 and, linked to processor 101, a memory 102. Memory 102 stores computer program code for checking the health of radio models. Processor 101 is configured to execute computer program code stored in memory 102 in order to cause an apparatus to perform desired actions.

Apparatus 100 could be a stationary device, like a positioning server or some other server, or a mobile device, like a mobile communication device. A stationary device is configured to be stationary when in operation. A mobile device is configured to enable operation while the device is moving. Apparatus 100 could equally be a module, like a chip, circuitry on a chip or a plug-in board, for a device. Optionally, apparatus 100 could comprise various other components, like a data interface, a user interface, a further memory, a further processor, etc.

An operation of apparatus 100 will now be described with reference to the flow chart of FIG. 2. The operation is an example embodiment of a method according to the invention. Processor 101 and the program code stored in memory 102 cause an apparatus to perform the operation when the program code is retrieved from memory 102 and executed by processor 101. The apparatus that is caused to perform the operation may be apparatus 100 or some other apparatus, for example but not necessarily a device comprising apparatus 100.

The apparatus obtains results of measurements for a plurality of communication nodes, the measurements performed by a mobile device at a particular position on signals of the communication nodes and the measurement results for each of the communication nodes including at least a signal strength related value and an identification of the communication node. (action 201)

The apparatus furthermore obtains for at least one of the plurality of communication nodes a stored indication of a location and a stored signal strength related value associated with the stored indication of a location, and determines for the at least one communication node a difference between the signal strength related value included in the results of measurements for the at least one communication node and the stored signal strength related value obtained for the at least one communication node. (action 202) The at least one communication node could be for instance a single communication node—for example the communication node for which the highest signal strength related value was obtained—or a plurality of communication nodes. The at least one communication node could comprise for instance all of the plurality of communication nodes for which measurement results are obtained, or all communication nodes for which the signal strength related value exceeds a predetermined threshold. In each case, the at least one communication node could comprise for instance only those communication nodes for which a stored signal strength related value is available.

The apparatus furthermore obtains for at least a part of the plurality of communication nodes stored radio model data, and estimates the particular position of the mobile device based on the obtained results of measurements for at least a part of the plurality of communication nodes and on the obtained stored radio model data. (action 203) The term radio model is to be understood in a broad sense. A radio model could be for instance a radio model for a particular communication node that is defined by values of a limited set of parameters. Such a radio model may be for instance in the form of an equation or a set of equations including the values of the parameters. Alternatively, a radio model could be for instance a radio map, which comprises signal strength values for a plurality of communication nodes mapped to a respective grid point of a grid, the grid points representing geographical locations of a particular site.

The apparatus furthermore determines a distance between the estimated particular position and a location indicated by the obtained stored indication of a location for the at least one communication node, as an indication of a health state of stored radio model data, in the case that the determined difference between the signal strength related value included in the results of measurements for the at least one communication node and the stored signal strength related value obtained for the at least one communication node falls short of a predetermined threshold. (action 204)

The quality of an indoor positioning may depend on the quality of radio models that are used for the positioning. Even if radio models of high quality are available for a certain site at a certain point of time, the quality may change due to subsequent infrastructure changes at the site, for instance a building. A change of infrastructure may include a change of the floor plan of buildings, like the construction of new rooms, but also a change of the locations of communication nodes.

Certain embodiments of the invention provide that a feature is stored for a communication node, which comprises a signal strength related reference value and a reference location. The feature indicates a signal strength related value that can be expected at a certain location when performing measurements on signals transmitted by the communication node, as long as the communication node is not relocated. Certain embodiments of the invention provide that it is determined whether a signal strength related value measured by a mobile device for a particular communication node is comparable to a stored signal strength related value for this particular communication node. In addition, a position is estimated based on measurement results obtained for several communication nodes and based on stored radio model data for these communication nodes. If the signal strength related values are comparable and the estimated position is close to the reference location, it may be assumed that the communication node has not been relocated and that the radio model data for the communication node is still of good health.

Certain embodiments of the invention may have the effect that changes in the location of communication nodes may be detected. This may provide an indication on the health of radio model data that is available for a particular site, and it may be used as a basis for taking actions. The suggested pattern matching may ensure that the health of radio model data can be checked with little effort during ongoing positioning computations for a mobile device.

Figure 2:
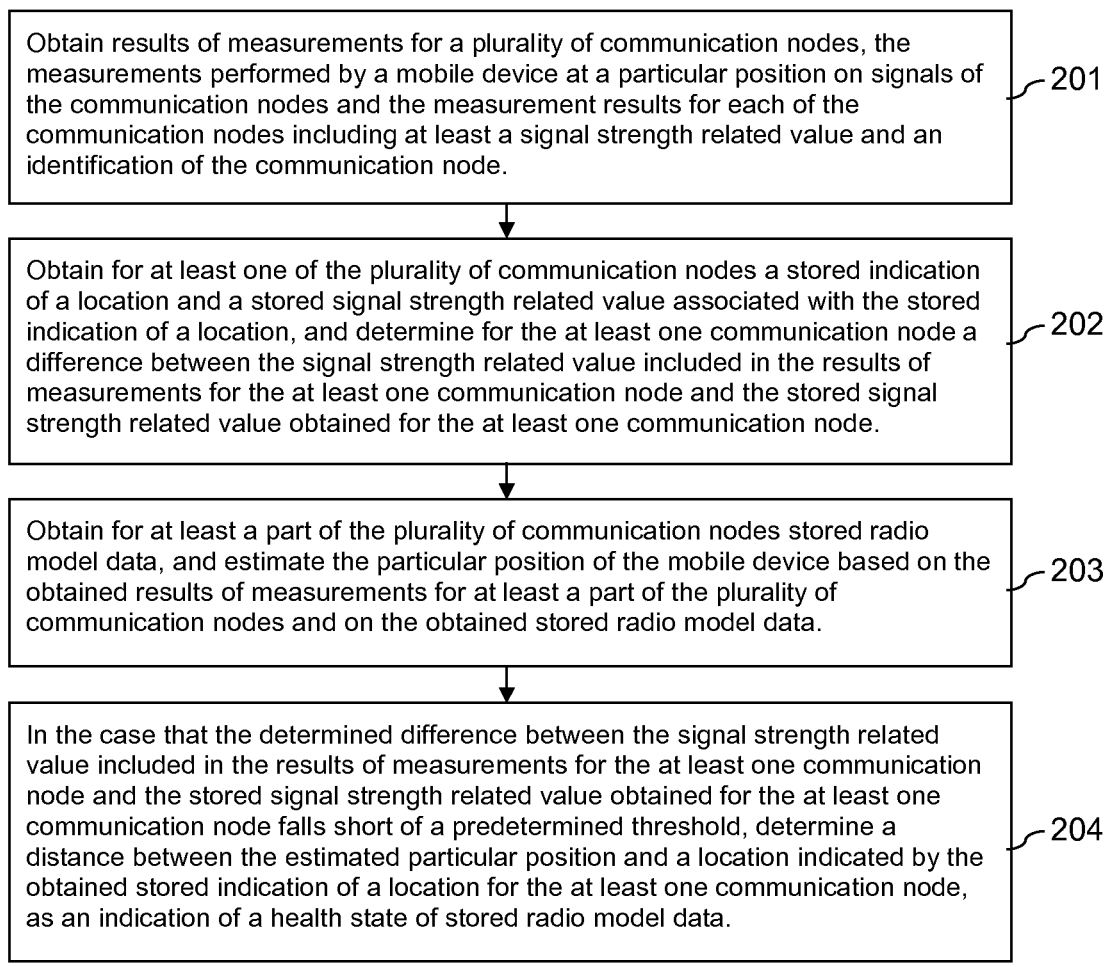
FIG. 2 is a flow chart illustrating an example embodiment of a method.

Apparatus 100 illustrated in FIG. 1 and the method illustrated in FIG. 2 may be implemented and refined in various ways.

The indication of a location and the signal strength related value associated with the location stored for a communication node may be selected in a suitable manner.

In certain embodiments, the indication of a location and the signal strength related value associated with the location stored for a communication node comprise an indication of a location of the communication node and an indication of a transmission power used by the communication node. This may be the case, if the location and transmission power do not have to be estimated but are known, for example based on information from the operator of the communication node. In certain embodiments, the indication of a location and the signal strength related value associated with the location stored for a communication node comprise an indication of an estimated location of the communication node and an indication of one of an estimated transmission power and an estimated apparent transmission power. This may have the effect that if an estimated location and an estimated apparent transmission power are determined anyhow as parameters of a parametric radio model, there is no need to determine and store additional values for each communication node. The apparent transmission power is to be understood to be the estimated received signal power at a predetermined distance to the location of the communication node, for example at a distance of 1 meter. In certain embodiments, the indication of a location and the signal strength related value associated with the location stored for a communication node comprise an indication of a location of a measurement of a strongest received signal strength during a collection of data as a basis for a generation of the radio model data and an indication of the strongest received signal strength. This may have the effect that such values are regularly available in fingerprints that may be used for generating radio model data. If such values are stored for each communication node, they may be used with any kind of radio model, for instance for parametric radio models and for radio maps. Furthermore, such values may have the effect that they may be suited to reflect the situation at a particular site particularly well. The indication of a received signal strength may be for instance a received signal strength indicator (RSSI) or a physical Rx level in dBm with a reference value of 1 mW, etc. Summarized, information on locations of communication nodes and on a transmission power used by the communication nodes can be based for example on observed signals and locations directly from fingerprints, on radio models that have been created using fingerprints and/or on information from an operator who knows the actual location and transmission power.

The signal strength related values obtained in the measurement results may be for example received signal strength values.

The position of the mobile device may be estimated based on all obtained measurement results or on selected measurement results. For example, some measurement results may be excluded from the estimation based on certain criteria.

In certain embodiments, the position is estimated based on measurement results and radio model data for communication nodes for which the measurement results include an indication of a received signal strength exceeding a threshold. This may have the effect that weak signals may be excluded from the estimation of the position. As a result the estimate may be more accurate, since weak signals are heard in a larger area and since weak signals are likely to be subject to more disturbances on their way to the measurement location. The threshold may be selected as desired. It may also be selected differently for different localization sites, for instance depending on the available density of communication nodes at the site. Alternatively or in addition, the position may be estimated based on measurement results and radio model data for communication nodes excluding a communication node for which a difference between the signal strength related value included in the results of measurements for the communication node and the obtained stored signal strength related value is determined.

This may have the effect that the signals of a communication node, for which the health of radio model data is to be checked, do not contribute to the estimated position, which may make the result more reliable.

In certain embodiments, the difference between the signal strength related value included in the results of measurements and an obtained stored signal strength related value is determined only for a communication node for which the signal strength related value included in the results of measurements exceeds a predetermined threshold. This may have the effect that only signals are considered that are transmitted by communication nodes that are fairly close to the position of the mobile device.

The distance between an estimated position of the mobile device and a reference location for a communication node, which is determined as an indication of a health state of stored radio model, data may be used as mere information and/or as a basis for triggering further actions.

Certain embodiments further comprise generating an indication that stored radio model data for a communication node is not up to date, in the case that the determined distance exceeds a predetermined distance for the at least one communication node. Such an indication may be provided for presentation to a user of the mobile device or for consideration by an application running in the mobile device and requiring information on the current position of the mobile device. This may have the effect that the user or an application is aware that an indicated position, if any, may not be accurate.

Certain embodiments further comprise generating an indication that stored radio model data for the at least one communication node is not up to date and causing transmission of the indication to a server, in the case that the determined distance exceeds a predetermined distance for the at least one communication node. This may have the effect that a server may be informed about the health state of radio model data for a localization site and may take actions, if needed.

Certain embodiments further comprise adding an identifier of a communication node to a list of communication nodes that are not to be used for positioning purposes, in the case that the determined distance for the communication node exceeds a predetermined distance. This may have the effect that signals of communication nodes that are not suited for positioning in view of the currently available radio model data can be removed autonomously from consideration in positioning computations. It may further have the effect that a determined likelihood of an estimated position of the mobile device is sharpened, since a presumably wrong likelihood resulting with the blacklisted communication node is not considered anymore. Such embodiments may thus not only allow detecting changes in infrastructure, but also controlling the quality of positioning by minimizing the effects of recent changes of infrastructure.

Certain embodiments further comprise determining a mean value of a plurality of distances determined at a plurality of positions of the mobile device for a particular communication node, and adding an identifier of the communication node to a list of communication nodes that are not to be used for positioning purposes in the case that the mean value exceeds a predetermined distance. This may have the effect that the decision on blacklisting a communication node is not based on a single measurement and is thus made more reliable.

Certain embodiments further comprise determining a percentage of communication nodes that are not to be used for positioning purposes, because a determined distance exceeds a predetermined distance for the communication nodes, and automatically initiating a download of new radio model data to the mobile device from a server, in case the percentage exceeds a predetermined threshold. This may take account of the fact that if too many communication nodes are to be excluded from positioning computations, an accurate positioning may not be possible anymore. It may thus enable a further control of the quality of positioning to minimize the effects of recent changes of infrastructures. Instead of downloading new radio model data for a particular site automatically, it would also be possible to inform a user of the mobile device in case such a download seems to be appropriate.

Certain embodiments further comprise determining a percentage of communication nodes that are not to be used for positioning purposes because a determined distance for the communication nodes exceeds a predetermined distance, and generating an indication that a reliable positioning is not possible, in case the percentage exceeds a predetermined threshold. This may take account of the fact that if too many communication nodes are to be excluded from positioning computations, an accurate positioning may not be possible anymore and that a user or an application can be made aware of this situation by means of the generated indication.

In certain embodiments, a server obtains for a site identifiers of communication nodes that are not to be used for positioning purposes, because determined distances for the communication nodes exceed a predetermined distance. The server may furthermore determine for the site a percentage of communication nodes that are not to be used for positioning purposes. The server may furthermore provide an indication to a service provider that an update of the radio model data for the site is required in case the percentage exceeds a predetermined threshold. This may have the effect that staff of a service provider may be informed automatically that collecting new data for a localization site would be appropriate so that corresponding action may be taken. It is to be understood that a server may perform such operations regardless of whether the distances for the communication nodes are determined by the server or by at least one mobile device which provides corresponding information to the server.

A server may also receive and evaluate further characteristic data indicative of changes in the radio infrastructure of a localization site. Such data may be provided for example by mobile devices and/or generated within the server.

In certain embodiments, a server may receive from a plurality of mobile devices identifiers of communication nodes detected by a respective mobile device at a particular site for which no stored radio model data is available at the respective mobile device for the particular site. Such identifiers may indicate to the server the installation of new communication nodes at a localization site. This may have the effect that the server may evaluate whether a new survey should be performed at a site, for instance if the ratio of the number of communication nodes for which no stored radio model data is available to the number of communication nodes for which stored radio model data is available for a site exceeds a predetermined threshold. Accordingly, if a percentage of communication nodes for which identifiers are received and for which no radio model data is available for the particular site (either at the plurality of mobile devices or in general) exceeds a predetermined threshold, the server may for example inform a service provider and/or initiate a collection of data at the particular site. It is to be understood that the server may check in advance whether stored radio model data for the indicated communication nodes is available to the server. This may be a sign that mobile devices are using old data, and the server may transmit an indication to the concerned mobile devices that updated radio model data is available for download instead of initiating a new survey of the site. In certain embodiments, a server may receive from a plurality of mobile devices an indication of a number of unsuccessful positioning attempts at a particular site and an indication of a number of successful positioning attempts at the particular site. If the ratio between unsuccessful positioning attempts and successful positioning attempts or all positioning attempts exceeds a predetermined threshold for a particular localization site, this may be an indication to a server that the quality of the radio model data for the localization site is not sufficient and that a new survey should be initiated at the site. Accordingly, if a percentage of unsuccessful positioning attempts at the particular site exceeds a predetermined threshold, the server may for example inform a service provider and/or initiate a collection of data at the particular site. In certain embodiments, a server may receive from a plurality of mobile devices an indication of a residual for a particular site. A residual is an error between radio model data and measurement results. For example, if a mobile device estimated its position, it may use stored radio model data to determine which signal strength related values would be expected for a particular communication node at the estimated position. A residual for the particular communication node may then be the error between the expected signal strength related value and the signal strength related value in the measurement results. When the infrastructure changes at a site, it is likely that the average residuals will increase. Receiving indications of residuals may thus have the effect that the server is enabled to deduce an infrastructure change in case the average of the residuals for a site exceeds a predetermined threshold so that a new survey should be initiated at the site. Accordingly, in case an average of residuals received for the particular site exceeds a predetermined threshold, the server may for example inform a service provider and/or initiate a collection of data at the particular site. In general, initiating the collection of data may include for example generating corresponding information for presentation to staff of a positioning service provider. It is to be understood that in any of these embodiments, a server could also take some other action, for example provide some feedback to the plurality of mobile devices or to other mobile devices requesting radio model data for the particular site.

In certain embodiments, a server may receive an indication of a percentage of communication nodes at a particular site for which no radio model data is available for the particular site. Such an indication could be provided for example by a competitor of a service provider operating the server. There could be for instance an agreement between the service provider and the competitor to provide radio model data and associated status information for sites surveyed by the competitor to the service provider. The server may for example inform a service provider about the percentage and/or provide to a service provider an indication if the percentage exceeds a predetermined threshold. This may have the effect that the service provider may contact the competitor or any other entity, if needed. Alternatively or in addition the server may for example associate an indication of the percentage with the radio model data or associate an indication with the radio model data which indicates that the percentage exceeds a predetermined threshold. This may have the effect that a mobile device requesting the radio model data for a particular site obtains in addition an indication on the quality of the radio model data.

In an example embodiment, the at least one communication node comprises at least one terrestrial communication node, since satellite signals may be less suited for indoor positioning. In an example embodiment, the at least one communication node comprises at least one non-cellular terrestrial communication node. The at least one non-cellular terrestrial communication node could comprise any non-cellular ground based communication node that is configured to transmit radio signals. In an example embodiment, it comprises at least one wireless local area network access point and/or at least one Bluetooth transmitter and/or at least one BTLE transmitter. It is to be understood that a Bluetooth transmitter and a BTLE transmitter could optionally be a part of a respective transceiver. WLAN and Bluetooth communication nodes are already installed in many buildings. Furthermore, WLAN and Bluetooth technologies are already supported in many mobile user devices, like smartphones, tablets, laptops and in the majority of feature phones. Using WLAN access points, Bluetooth transmitters and/or BTLE transmitters as communication nodes may thus have the effect that the supported positioning can be based on an existing infrastructure in buildings and on existing capabilities in mobile devices. As a result, the approach may be globally scalable and have low maintenance and deployment costs. The deployment of new infrastructure, including for example beacons and tags, is not necessary. In addition, the end-user experience may be acceptable with these technologies, since a horizontal positioning accuracy of 2-3 meters as well as close to 100% reliability in floor detection may be achieved. It is to be understood that the at least one communication node could also comprise at least one cellular transmitter, like a base station of a cellular communication network. However, due to the narrow frequency bands of cellular signals, WLAN and Bluetooth nodes may generally enable a more accurate positioning. Furthermore, communication nodes transmitting any other kind of wireless signals, including for instance ultra-wideband (UWB) signals or any wireless signals that might emerge in the future, may be used as well. The communication nodes do not even have to be ground-based necessarily. For example, the communication nodes could also comprise communication nodes in a ship.

In an example embodiment, the apparatus that is checking the health of radio model data is or belongs to the mobile device which is to be positioned. This may have the effect that the mobile device may improve the quality of a positioning based on stored radio model data independently of a server. In an alternative example embodiment, the apparatus that is checking the health of radio model data is or belongs to a server that is configured to obtain results of measurements for a plurality of communication nodes from mobile devices, for instance in the scope of a positioning request from the devices. This may have the effect that processing resources of the mobile device are saved. This may further have the effect that information from health checks that are based on measurement results from one mobile device may be used for improving the positioning quality for other mobile devices. This may further have the effect that information from health checks may easily be bundled at a single entity, which also facilitates the decision on whether new radio model data should be generated for a particular site. It is to be understood, however, that in case the health of radio models is checked at mobile devices, the result of the checking may also be provided to a server for further evaluation.

Figure 3:
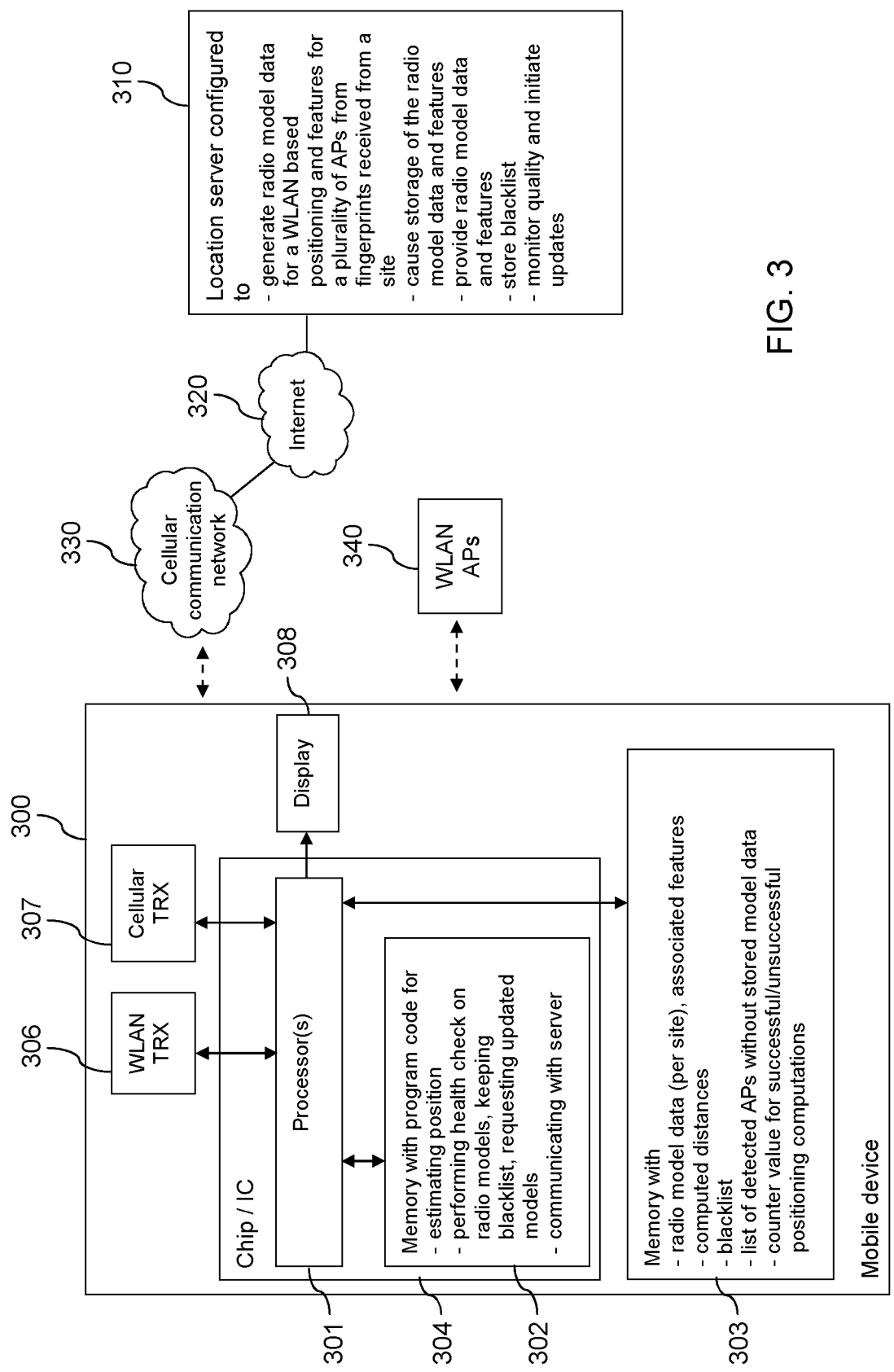
FIG. 3 is a schematic block diagram of a first example embodiment of a system.

FIG. 3 is a schematic block diagram of a first example embodiment of a system according to the invention. The system may support a checking of the health of radio model data at a mobile device, and an evaluating of the health of radio model data at a mobile device and at a server.

The system comprises a mobile device 300 and a location server 310. The system further comprises a network 320, by way of example the Internet. The system further comprises a cellular communication network 330 that is connected to the Internet 320. The system further comprises a number of WLAN access points (AP) 340.

Mobile device 300 may be for instance a mobile terminal, like a regular smartphone or a tablet PC. Mobile device 300 comprises a processor 301 that is linked to a first memory 302, to a second memory 303, to a WLAN component 306, to a cellular communication component 307 and to a display 308.

Processor 301 is configured to execute computer program code, including computer program code stored in memory 302, in order to cause mobile device 300 to perform desired actions.

Memory 302 stores computer program code for estimating a position of mobile device 300 using stored radio models, computer program code for performing a health check on radio models, for keeping a blacklist of communication nodes and for requesting updated radio models, and computer program code for communicating with server 310. Some of the program code in memory 302 may be similar to the program code in memory 102. In addition, memory 302 could store computer program code configured to realize other functions. In addition, memory 302 could also store other kind of data.

Processor 301 and memory 302 may optionally belong to a chip or an integrated circuit 304, which may comprise in addition various other components, for instance a further processor or memory.

Memory 303 is configured to store various kind of data, including for example radio model data for particular sites, which are associated with features for communication nodes, computed distances, a blacklist, a list of detected WLAN access points for which no radio model is available, and counter values for counting successful and unsuccessful positioning computations. Memory 303 could be configured to store any other desired data as well.

WLAN component 306 includes at least a WLAN transceiver (TRX). WLAN component 306 enables mobile device 300 to perform radio measurements on radio signals that are broadcast by WLAN access points 340. In addition, it may enable mobile device 300 to establish a connection with WLAN access points 340 for accessing the associated WLAN. It is to be understood that any computer program code based processing required for a WLAN communication could be stored in an own memory of WLAN component 306 and executed by an own processor of WLAN component 306, or it could be stored for example in memory 302 and executed for example by processor 301.

Cellular communication component 307 includes at least a cellular transceiver. It enables mobile device 300 to communicate with other entities via cellular communication network 330. It could be a cellular engine that is configured to take care of all processing required for a cellular communication. Alternatively, at least some of the processing that is required for a cellular communication may be realized by processor 301 executing corresponding additional program code stored in memory 302.

Display 308 could be a touchscreen or a display that is not touch sensitive.

It is to be understood that mobile device 300 could comprise various other components, like user input means and speakers.

Component 304 or mobile device 300 could be an example embodiment of an apparatus according to the invention.

Location server 310 is a server that is configured to generate radio model data for a WLAN based positioning and a feature for each of a plurality of access points based on fingerprints received from a respective localization site. It is also configured to cause storage of the generated data. It is also configured to provide radio model data and features to mobile devices. It may also be configured to store a blacklist of WLAN access points. It may also be configured to monitor the health of stored radio model data and to initiate updates. Server 310 could comprise a memory for storing data and/or it could be configured to access an external memory storing data, optionally via another server.

Cellular communication network 330 could be any kind of cellular communication network, like a Global System for Mobile Communications (GSM), a CDMA2000, a Universal Mobile Telecommunications System (UMTS), or a long term evolution (LTE) based communication network.

The WLAN access points 340 could be access points of one or more WLANs. The WLAN or WLANs may but do not have to be connected to the Internet 320.

Figure 4:
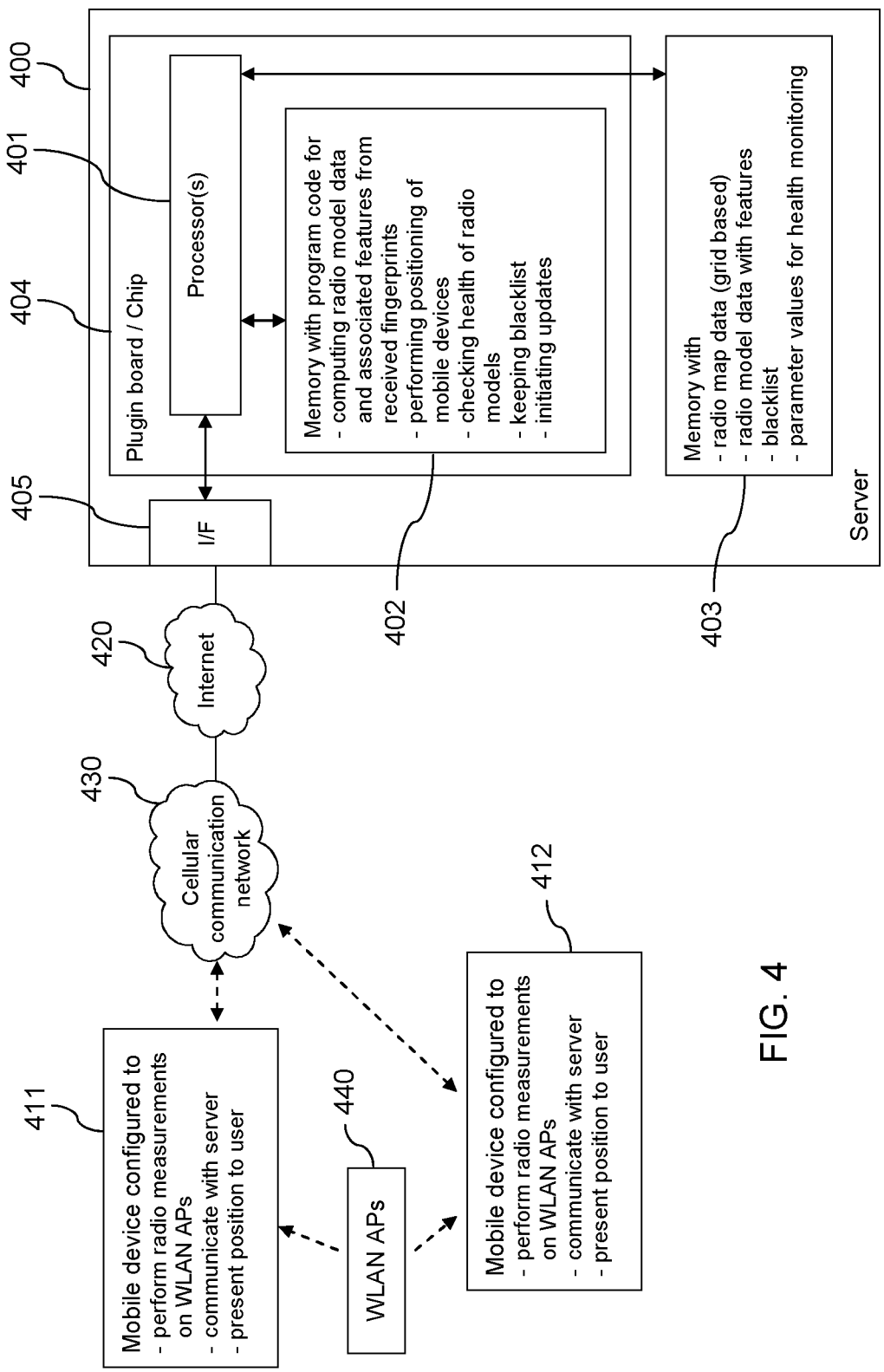
FIG. 4 is a schematic block diagram of a second example embodiment of a system.

FIG. 4 is a schematic block diagram of a second example embodiment of a system according to the invention. In this case, the system may support a checking and evaluating of the health of radio model data at a server.

The system comprises a server 400 and a plurality of mobile devices 411, 412. The system further comprises a network 420, by way of example the Internet. The system further comprises a cellular communication network 430 that is connected to the Internet 420. The system further comprises a number of WLAN access points 440.

Server 400 may be for instance a server that is provided specifically for performing positioning computations for mobile devices and for monitoring the quality of stored radio model data, or it could be a server which also takes care of generating and updating the radio models, or it could be any other server. Server 400 comprises a processor 401 that is linked to a first memory 402, to a second memory 403 and to an interface (I/F) 405.

Processor 401 is configured to execute computer program code, including computer program code stored in memory 402, in order to cause server 400 to perform desired actions.

Memory 402 stores computer program code for computing and storing radio model data and associated features from received fingerprints, computer program code for performing a positioning of mobile devices upon request based on received results of measurements on radio signals and stored radio model data, computer program code for checking the health of radio model data, for keeping a blacklist of access points and for initiating an update of the stored radio model data. Some of the program code may be similar to the program code stored in memory 102. In addition, memory 402 could store computer program code configured to realize other functions, for instance for providing assistance data to mobile devices upon request. In addition, memory 402 could also store other kind of data.

Processor 401 and memory 402 may optionally belong to a plug-in board or a chip with an integrated circuit 404, which may comprise in addition various other components, for instance a further processor or memory.

Memory 403 is configured to store data on a per site basis. It is configured to store data including for example data of a grid based radio map, data for parametric radio models and associated features, a blacklist and various parameter values that are used in monitoring the health of the radio model data. In addition, it could store other data.

It is to be understood that the data of memory 403 could also be distributed to several memories, which may be partly or completely external to server 400. For example, the blacklist and parameter values used for monitoring the health of stored radio model data could be stored internal to server 400 and radio map data and radio model data could be stored at an external memory that is accessible via another server.

Interface 405 is a component which enables server 400 to communicate with other devices, like mobile device 411 and 412, via networks 420 and 430. It could also enable server 400 to communicate with other entities, like other servers or terminals of staff of a positioning service provider operating server 400. Interface 405 could comprise for instance a TCP/IP socket.

It is to be understood that server 400 could comprise various other components.

Component 404 or server 400 could be an example embodiment of an apparatus according to the invention.

Mobile devices 411, 412 may be for instance mobile terminals, like regular smartphones or tablet PCs. They are configured to perform radio measurements on WLAN access points, to communicate with server 400 and to present a position of mobile device 411, 412 to a user.

Cellular communication network 430 could be again any kind of cellular communication network.

The WLAN access points 440 could be again access points of one or more WLANs. The WLAN or WLANs may but do not have to be connected to the Internet 420.

While the systems of FIG. 3 and FIG. 4 are different in that the system of FIG. 3 enables a mobile device 300 to perform a health check on radio model data and the system of FIG. 4 enables a server 400 to perform a health check on radio model data, the actual operations that are carried out for the health check may be similar.

Figure 5:
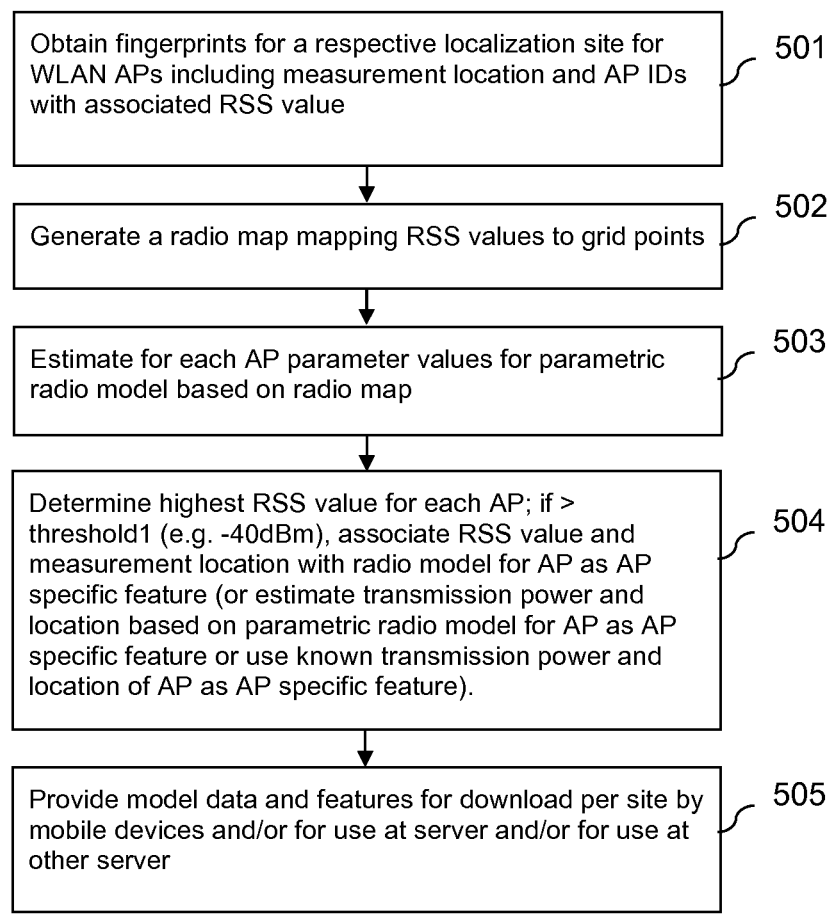
FIG. 5 is a flow chart illustrating first example operations in the system of FIG. 3 or 4.
Figure 6:
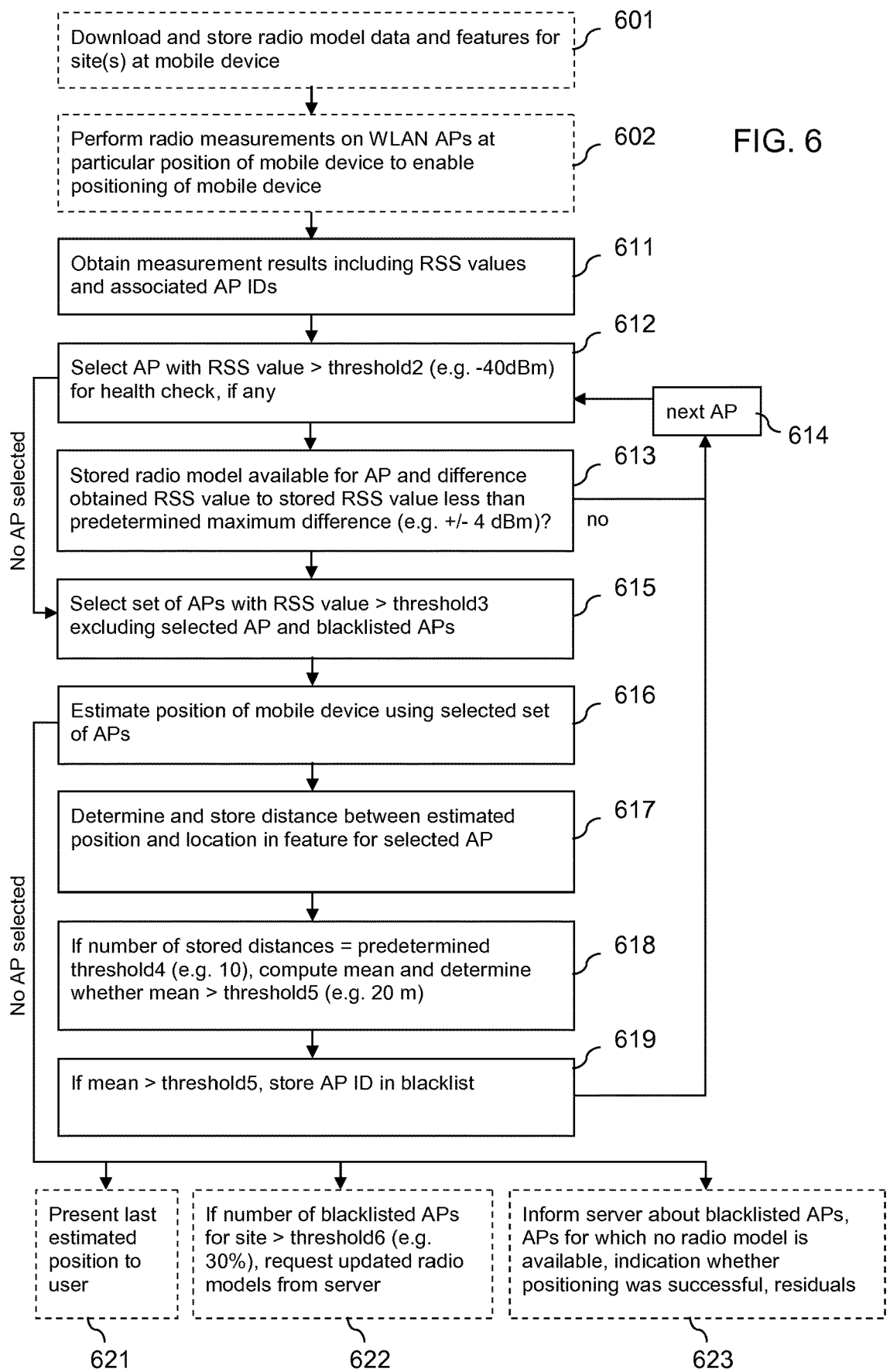
FIG. 6 is a flow chart illustrating second example operations in the system of FIG. 3 or 4.
Figure 7:
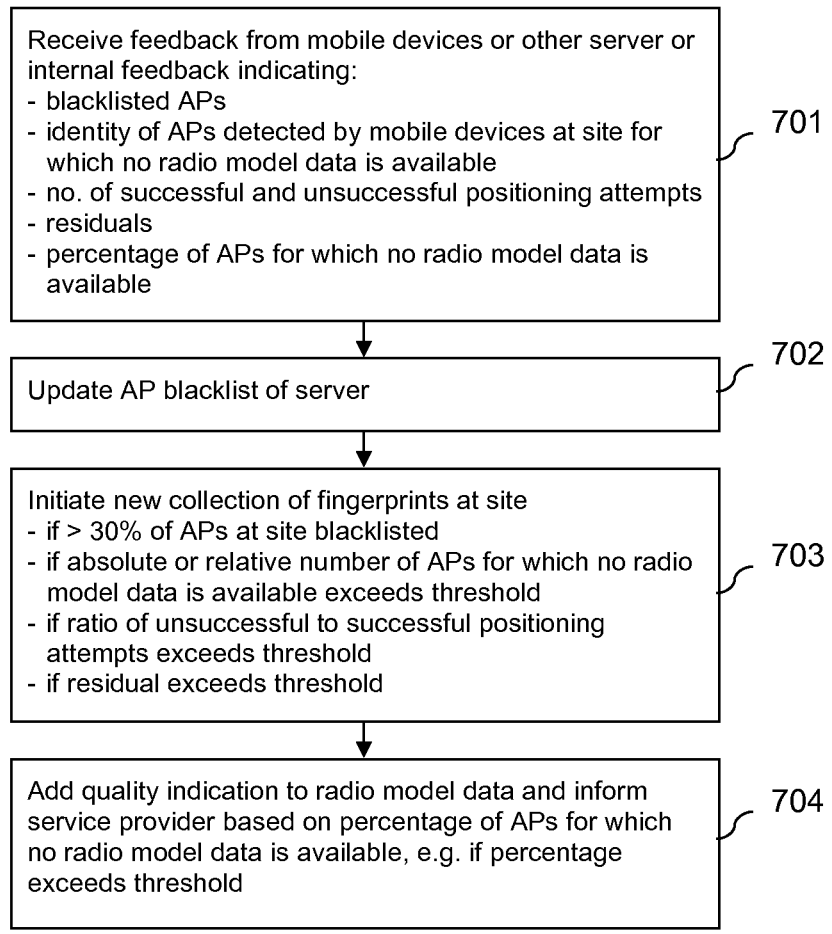
FIG. 7 is a flow chart illustrating third example operations in the system of FIG. 3 or 4.

FIGS. 5 to 7 are flow charts illustrating example operations in the system of FIG. 3 or FIG. 4. FIG. 5 relates to a generation of radio model data, FIG. 6 relates to checking and evaluating of the health of radio model data, and FIG. 7 relates to an evaluation of the health of radio model data and to updates of radio model data.

Example operations in the system of FIG. 3 or FIG. 4 will now be described with reference to FIG. 5.

In the case of FIG. 4, processor 401 and some of the program code stored in memory 402 may cause server 400 of FIG. 4 to perform the presented actions when program code is retrieved from memory 402 and executed by processor 401. The same operations could be performed by server 310 of FIG. 3.

In order to be able to create radio model data for a particular localization site, like a particular building, server 400 obtains fingerprints collected by mobile devices at the site. The collecting mobile devices may be devices of users who allowed their devices to collect and transmit fingerprints, or devices of special surveying persons hired to survey the particular site. Each fingerprint includes results of measurements at a measurement location at a certain point of time on signals transmitted by WLAN access points and an indication of the measurement location. The results of the measurements contain an identifier (ID) of each access point, for example a basic service set identification (BSSID), like the medium access control (MAC) address of the observed access point, and the service set identifier (SSID) of the observed access point. Associated with each access point identifier, the results of the measurements further contain a signal strength related value indicating a measured signal strength of a signal transmitted by the identified access point, for example a received signal strength (RSS) value in the form of a physical Rx level in dBm. The location of measurement included in a fingerprint could be determined by a fingerprint collecting mobile device for instance using an assisted satellite signal based positioning, or the user of the mobile device could be required to enter information on a respective measurement location. (action 501)

Server 400 maps the results of the measurements in the fingerprints to grid points of one or more grids. (action 502) A grid could be defined for example for each floor of the localization area. Each grid could be for example a uniformly spaced rectangular two-dimensional grid representing a geographical area that includes the area of one of the floors of the localization area. Each grid could have for instance grid step of 10 meters in each direction. The measurement results in each of the fingerprints could then be mapped to a grid point of the grids that is provided for one of the floors. Each grid point could represent a particular geographic location of the surveyed localization area and possibly of some surrounding area. The correct floor and thus the correct grid could be determined based on an altitude component in the location that is indicated in the respective fingerprint and on knowledge about the floor height in a building. The grid point to which the measurement results of a particular fingerprint are mapped could be the grid point that corresponds to a real geographic location that is closest to the horizontal location indicated in the fingerprint. If the measurement results for the same WLAN access point from several fingerprints have to be mapped to the same grid point, an average value of the received signal strength could be used, for example. The result can be considered to be a radio map, which indicates for various locations corresponding to a grid point an expected RSS value for one or more WLAN access points. Instead of using a separate two-dimensional grid for each floor, it would also be possible to use a cuboid three-dimensional grid for an entire multi-level building. The grid values may be stored by server 400 for example in memory 403.

Server 400 now generates a radio model for each WLAN access point for which RSS values are available in the radio map by estimating the values of parameters defining the radio model. (action 503) The parameter values may be stored by server 400 for example in memory 403. The radio model may be any kind of model that is defined by values of a limited set of parameters and that enables an estimation of a position of a mobile device based on RSS measurements of the mobile device on matching WLAN access points. By way of example, it is assumed that the radio model is a path loss model, which is defined by an estimation of the location of the WLAN access point, an estimation of an apparent transmission power used by the WLAN access point for transmitting signals and an estimated path loss exponent. The parameter values for each radio model could be estimated for example using a standard radio signal propagation model and the Gauss-Newton algorithm for a non-linear fitting problem.

In addition, server 400 determines the highest RSS value for each access point. (action 504) If this highest RSS value exceeds a first threshold (threshold1), the RSS value and the location of measurement are assembled as feature specific to this access point. The threshold could be set for instance to −40 dBm, but it could also be set to any other value. The determined highest RSS value for the feature can correspond to the strongest RSS actually measured, as indicated in a fingerprint, or the highest mean value for the access point that has been assigned to one of the grid points of the grid or grids used for the site. The measurement location for the feature can be the actual measurement location as indicated in a fingerprint or the location represented by the grid point to which the at least one RSS value was mapped. The feature is associated with the access point, for instance by storing it such in memory 403 that it is associated with the data of the radio model that has been generated for the access point. The feature x for an access point APi could be written as x=[Ref_Pos_APi;Ref_RSS_APi], with i being an index for all access points for which a feature is determined. The RSS values that are used in the features can be expected to lie in a range of −40 dBm to −50 dBm.

Creation of an exemplary feature x for an access point from a training data set can be explained with the help of following table. The table comprises data for five locations at which an access point (Access Point 1) was heard with a power given in dBm. Each location is indicated by Easting and Northing for a horizontal position and a floor number for an altitude.

| | Access Point 1 | |
|---|---|---|
| Location No: | Power as RSS (Received signal strength) in dBm | Locations (ENU) as [East, North] Floor |
| 1 | −45 | [2, 4] floor 3 |
| 2 | −65 | [3, 4] floor 3 |
| 3 | −85 | [5, 6] floor 3 |
| 4 | −90 | [7, 8] floor 3 |
| 5 | −90 | [−7, −9] floor 3 |

The feature for this access point can be the RSS value at the location where it was heard with maximum power, that is, with RSS=−45 dBm. The feature can be written as <x=[2,4,floor 2, −45]>. Similarly, features for other access points can be determined by checking the locations where they were heard and the observed power of their signals at those locations.

In another embodiment, it would also be possible to estimate instead a transmission power of the access point and a location of the access point using a parametric radio model that has been generated for the access point, and to use these estimated values as a feature for the access point. In yet another embodiment, it would be possible to use a known transmission power and a known location that are available as prior information for an access point as feature for the access point. It would also be possible to combine two or more of these options. For instance, it would be possible to use a known transmission power and a known location for all access points for which such information is available, and to use one of the other options for all access points for which such information is not available.

Server 400 provides the radio model data and the features for a respective site for download by mobile devices and/or for use at server 400 and/or for use at some other server. (action 505)

It is to be understood that determining parameter values for a parametric radio model in action 503 is not essential. In this case, the feature for an access point determined in action 504 could be associated separately with an identifier of each access point for which data is included in the radio map generated in action 502. Server 400 could furthermore provide in action 505 radio map data as radio model data and in addition the data associating access point identifiers to a respective feature.

The entity receiving the data provided in action 505 may then use the data for computing a position of a mobile device and for checking the health of the radio models. This will be described in more detail with reference to FIG. 6.

FIG. 6 is a flow chart illustrating by way of example further example operations in the system of FIG. 3, in which a mobile device 300 takes care of checking the health of radio models.

Processor 301 and some of the program code stored in memory 302 may cause mobile device 300 of FIG. 3 to perform the presented actions when the program code is retrieved from memory 302 and executed by processor 301.
1
In order to enable mobile device 300 to determine its position offline at certain localization sites, for instance for a selected set of buildings, a user of mobile device 300 may cause mobile device 300 to download radio model data for these sites. Thereupon, mobile device 300 may download radio model data for the selected sites and associated features from server 310 and store the data in memory 303 for immediate or future use. (action 601)

When a user of mobile device 300 or some application running on mobile device 300 desires to know the current position of mobile device 300 or to track the position of mobile device 300, mobile device 300 triggers a measurement of radio signals transmitted by WLAN access points by means of WLAN transceiver 306. WLAN transceiver 306 performs the radio measurements at a current position of mobile device to enable a WLAN based positioning of mobile device 300. (action 602)

In addition, a positioning of mobile device 300 is triggered. The measurement results are obtained as a basis for the positioning. (action 611) The measurement results include RSS values and associated identifiers of access points.

The positioning also requires stored radio model data for the localization site at which mobile device 300 is located. The site can be input for instance by the user of mobile device 300, or it could be determined based on some other type of positioning that is used otherwise by mobile device 300, like a satellite signal based positioning or a cellular based positioning.

For checking the health of the required radio models, mobile device 300 determines whether any of the RSS values in the obtained measurement results exceeds a second threshold (threshold2). The threshold could be for example −40 dBm. Mobile device 300 selects a first one of these access points, if any. (action 612)

Mobile device 300 determines whether stored radio model data is available for the selected access point. If this is the case, it determines a difference between the measured RSS value and an RSS value stored in a feature in association with radio model data or with an access point identifier, and it determines whether this difference falls short of a predetermined maximum difference. In this case, the access point is considered eligible for health checking. This difference could be set for instance to +/−4 dBm, but any other value could be selected just the same. (action 613) This action is omitted, in case no access point was selected in action 612. If the difference is greater than the predetermined maximum difference, mobile device 300 may continue with action 612 for a next access point, if any. (action 614)

Mobile device 300 now selects a set of access points for which an RSS value in the measurement results exceeds a third threshold (threshold3). The third threshold may be the same as the second threshold in action 612, but it could also be set for example to a lower value. Mobile device 300 excludes from the set the access point last selected in action 612, if any, all access points that are included in a blacklist in memory 303, if any, and all access points that are identified in the list of detected access points without stored model data in memory 303. (action 615)

Mobile device 300 estimates the position of mobile device 300 using the measurement results for the access points of this selected set of access points and the radio model data stored in memory 303 for the access points of this set of access points. (action 616) The positioning may be performed using any known method, depending on the kind of the radio model for which radio model data is stored in memory 303. If the radio model is a path loss model, it would be possible to estimate the position using a suitable algorithm, for instance an algorithm that is based on a Gauss-Newton method. If the radio model data is data for a parametric radio model, but includes only a location of an access point and a radius of a covered area, it would be possible to estimate a position to correspond to an intersecting area of several coverage areas of access points heard by mobile device 300. If the radio model is a radio map, it would be possible, for instance, to find a best match for a set of radio measurements in a radio map. If the selected set of access points includes access points for which no radio model data is available in memory 303, the measurement results for these access points are not used for estimating the position, and the identifiers of these access points are added to the list of detected access points without stored model data in memory 303.

An estimated feature for the selected access point APi can be written as y=[estimated_Pos_APi; observed_RSS_APi], where estimated_Pos_APi is the position estimated in action 616 and where observed_RSS_APi is the RSS value for the selected access point in the measurement results obtained in action 611.

Mobile device 300 may now determine a distance between the position of mobile device 300 estimated in action 616 and the location in the feature that is stored for the access point last selected in action 612. Mobile device 300 may store the distance in memory 303. (action 617)

If the number of distances that is stored in memory 303 for the last selected access point exceeds a predetermined fourth threshold (threshold4), mobile device 300 computes the mean of these values. The predetermined fourth threshold could be set for instance to 10, but it could also be set to any other number. Mobile device 300 further determines whether the computed mean exceeds a fifth predetermined threshold (threshold5). This threshold could be set for instance to 20 meters, but it could also be set to any other distance. (action 618)

If mobile device 300 determines that the mean exceeds the predetermined fifth threshold, mobile device 300 may store the identifier of the access point in the blacklist in memory 303. (action 619) This means that at the present localization site, measurement results on signals transmitted by this access point will be omitted from all positioning computations.

Selecting the highest RSS values for the access point specific feature in action 504 for comparison in action 613 may ensure the reliability of the blacklisting process. Firstly, the WLAN access points are distributed throughout the site, so it may be good to check the access points which are closer to the mobile device that is to be positioned. The closeness of an access point to the mobile device is indicated by a higher received power from the closer access points. Secondly, the area in which high power signals are heard from an access point may be small compare to the area in which weak signals of the access point are heard, which also makes high RSS values a better choice for the feature of an access points. Furthermore, the high power signals undergo less variation in one location compared to low power signals, so they are a better choice for the features. This may be the case, because a radio signal faces many disturbances on its path in indoor environments. So the closer user is to the access point, the higher the probability that the signal will face little disturbances. That is, when creating a distribution of power of WLAN access point measurements in one place, then the access points which are being heard with strong power will have a distribution with a smaller standard deviation in terms of received power than the access points which are being heard with weak power.

Optionally, mobile device 300 may continue the operations with a next access point (action 614), until all access points with an RSS value exceeding the second threshold have been selected once in action 612 and processed in the subsequent actions 613 to 619 for determining whether the access point should be included in the blacklist.

When no further access point meeting the given criterion can be selected in action 612, the set of access points selected in action 615 includes all access points that are not in the blacklist (and optionally, that exceed the third threshold).

A final position may then be estimated in action 616, if this is possible based on the available data.

Mobile device 300 then presents this last position estimate to the user of mobile device 300 via display 308, or informs a requesting application of mobile device 300 about the determined position. In case the position is to be indicated to a user, it may be presented as a dot or some other marking on a map of the site or on a map of the floor of the site on which the user is located. (action 621) If the last positioning attempt was successful, mobile device 300 may also increment a counter in memory 303 indicating the numbers of successful positioning attempts at the localization site. If the last positioning was not successful, in contrast, mobile device 300 may increment a counter in memory 303 indicating the numbers of unsuccessful positioning attempts at the localization site. In this case, also the user of mobile device 300 or a requesting application of mobile device 300 may be informed about the unsuccessful positioning attempt. For a tracking of mobile device 300, actions 602 to 621 may be repeated at various locations on a track of mobile device 300. In this case, the user of mobile device 300 or a requesting application of mobile device 300 may optionally only be informed about a unsuccessful positioning attempt after a sequence of unsuccessful positioning attempt.

In addition, mobile device 300 may compare the number of blacklisted access points to the number of access points for which radio model data is available for the localization site in memory 303. If the ratio of blacklisted access points to all access points for which radio model data is available for the site exceeds a sixth predetermined threshold (threshold6), mobile device 300 may autonomously request updated radio model data from server 310. (action 622) Alternatively, mobile device 300 could suggest to the user to request updated radio model data from server 310, for example, by selecting an offered option to download updated radio model data. The sixth threshold could be set for instance to 30%, but it could equally be set to any other value. If updated radio model data is available for the site and if it is downloaded and stored in memory 303, the blacklist for this site may be reset, that is, all access point identifiers may be deleted. Also the list of detected access points without stored model data and the counter values for successful and unsuccessful positioning computations in memory 303 may be reset for this site.

Finally, mobile device 300 may inform server 310 about the result of the health check of radio model data. For example, mobile device 300 may indicate to server 310 the identities of the access points that have been added to the blacklist for the localization site. Optionally, mobile device 300 may provide other characteristic data that may be relevant to the quality of radio model data to server 310. Such characteristic data may comprise the identifier of access points for which no radio model data was stored, an indication whether the positioning was successful or not, and an indication of a residual. (action 623) It is to be understood that such a feedback to server 310 does not have to be provided after each final positioning of mobile device 300 at a particular location. Data for such a feedback could also be collected at mobile device 300 for transmission to server 310. It could be transmitted, for example, at regular intervals or once mobile device 300 leaves the localization site. If the user of mobile device 300 moves through the localization site, the health of all access points in the site or at least of all access points which can be heard on the track of the user may be checked in an iterative manner using the presented process.

In example operations in the system of FIGS. 4, in contrast, processor 401 and some of the program code stored in memory 402 may cause server 400 to perform the actions 611 to 619 of FIG. 6 when corresponding program code is retrieved from memory 402 and executed by processor 401. Actions 601, 602, 621, 622 and 623 could be performed by mobile devices 411, 412 of FIG. 4, and any communication between mobile devices 411, 412 and server 400 may take place via cellular communication network 430 and the Internet 420.

Further example operations in the system of FIG. 3 or FIG. 4 will now be described with reference to the flow chart of FIG. 7.

In the case of FIG. 4, processor 401 and some of the program code stored in memory 402 may cause server 400 of FIG. 4 to perform the presented actions when some of the program code is retrieved from memory 402 and executed by processor 401. The same operations could be performed by server 310 of FIG. 3.

Server 400 may receive information from mobile devices 411, 412 or from some other server or from internal processes, the information identifying access points that have been blacklisted for a particular site in a health check during positioning computations. (action 701) In addition, server 400 may receive various additional quality related information. It may receive for example information identifying access points that have been detected by mobile devices for which no radio model is available for a particular site; it may receive an indication of the number of successful and unsuccessful positioning attempts; and/or it may receive an indication of a residual. Server 400 may also receive an indication of a percentage of access points that have been detected by mobile devices at a particular site and for which no radio model is available for the particular site. Such a percentage may be received for example from a server operated by a competitor of a positioning service provider operating server 400. The competitor may be responsible for surveying the particular localization site and provide radio model data to server 400 so that the service provider operating server 400 is enabled to provide comprehensive data to users.

Based on the received information, server 400 may update a blacklist of access points in memory 403. (action 702) The blacklist identifies those access points that should not be considered for a positioning of mobile devices. Such a blacklist may be considered when providing radio model data in action 505. For instance, the radio model data for those access points that are blacklisted by be excluded from provided data.

Sever 400 further determines whether a new collection of fingerprints for a particular localization site should be initiated. (action 703) A new collection may be initiated, for example, by generating a corresponding indication to personnel of a positioning service provider operating server 400, who is responsible for hiring surveying persons for surveying a particular site.

It may be decided to initiate a new collection of fingerprints for a particular site, for example, if more than 30% of the access points for which radio models are available for the particular site are blacklisted. It is to be understood that any other percentage could be selected just the same.

It may be decided to initiate a new collection of fingerprints for a particular site, for example, if an absolute or relative number of access points, which were detected by mobile devices at the particular site and for which no radio model data exists, exceeds a predetermined threshold.

It may be decided to initiate a new collection of fingerprints for a particular site, for example, if the ratio of unsuccessful positioning attempts to successful positioning attempts (or to all positioning attempts) at a site exceeds a predetermined threshold.

It may be decided to initiate a new collection of fingerprints for a particular site, for example, if an average of indicated residuals for a site exceeds a predetermined threshold.

If server 400 has received in action 701 an indication of a percentage of access points that have been detected by mobile devices at a particular site and for which no radio model is available for the particular site, server 400 may not be in a position to initiate a collection of new data in case the percentage exceeds a predetermined threshold, since the service provider operating server 400 may not be responsible for surveys at this site. Server 400 may add a quality indication to the radio model data for this particular site based on the received indication of a percentage, though, so that users requesting the radio model data for the site may be informed about the quality of positioning that may be expected at the site. In addition, the service provider could be informed about the status at the site. (action 704)

It is to be understood that the presented example system as well as the presented example operations may be varied in many ways. The operations may be varied for instance by modifying actions, by omitting actions and/or by adding actions. In addition, the order of actions could be modified.

For example, in an alternative embodiment the radio model data may not be generated based on fingerprints, as suggested in FIG. 5. Alternatively, the relevant data for all or some of the WLAN access points (including for example location and transmission power) could be provided by the operators of the WLAN access points or by the owner of a site.

For example, in an alternative embodiment, the fingerprints could include results on measurements on signals of other non-cellular terrestrial communication nodes instead of or in addition to WLAN access point signals.

Summarized, certain embodiments of the invention may have the effect that they allow obtaining information on the health of radio model data. The information may be generated at a mobile device or at a server and it may be exploited in various ways at a mobile device and/or at a server.

Information on the health of radio model data may be generated and used at a mobile device for instance to inform the user or an application running on the mobile device and requiring position information about results of a health check. Alternatively or in addition, the information may be used at a mobile device for instance to upgrade radio model data stored at a mobile device by blacklisting certain communication nodes so that suspicious communication nodes will not affect the process of estimating a position of the mobile device using stored radio model data. This may allow improving the positioning performance. Alternatively or in addition, information on the health of radio model data may be used at a mobile device for instance in the scope of an automatic mechanism to download updates for stored radio model data. When a certain number of communication nodes has been blacklisted, the mobile device may check (autonomously or upon user confirmation) whether updates are available at a server and whether the updates should be downloaded. This may equally allow improving the positioning performance.

Information on the health of radio model data may be generated at a server or obtained at a server from mobile devices. The information may be used at a server for instance as well for blacklisting certain communication nodes so that suspicious communication nodes will not affect the process of estimating a position of a mobile device using available radio model data. This may be of use if a positioning of mobile devices is performed by the server; but it could also be used for enabling the server to provide mobile devices with a reduced set of radio model data, if the positioning is to be performed at the mobile devices based on downloaded radio model data. Alternatively or in addition, the information may be used at a server, for instance in an automatic process, to determine whether a site requires some attention of, for example, staff of a positioning service provider, if a large number of communication nodes for which radio model data is available is blacklisted. The information on the health of communication nodes—and possibly some additional characteristic data—can indicate to the server if the radio infrastructure at a site has been changed so that fresh data should be collected from the site in order to be able to provide a good quality of service.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 8:
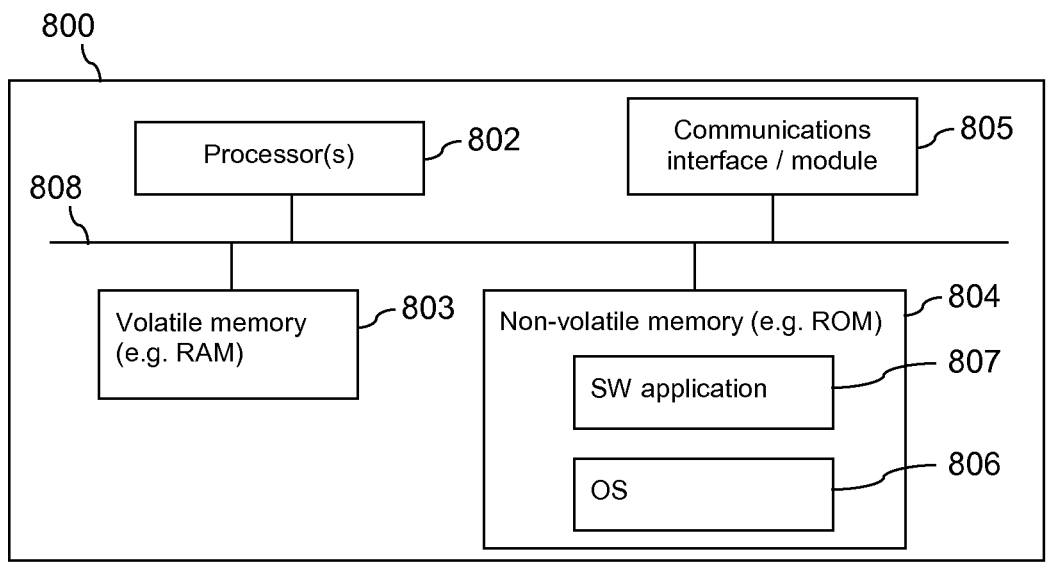
FIG. 8 is a schematic block diagram of an example embodiment of an apparatus.
Figure 9:
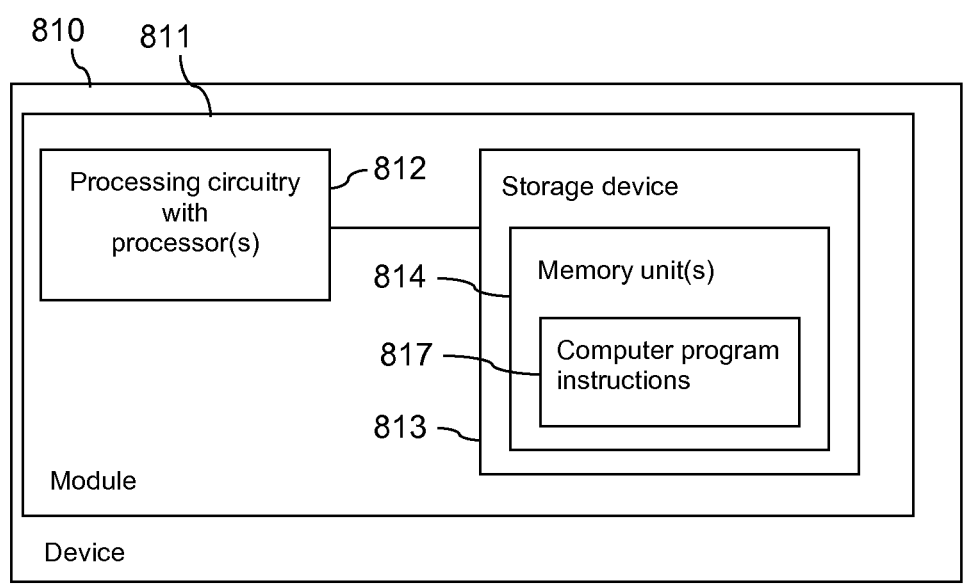
FIG. 9 is a schematic block diagram of an example embodiment of an apparatus.

Example embodiments using at least one processor and at least one memory as a non-transitory data medium are shown in FIGS. 8 and 9.

FIG. 8 is a schematic block diagram of a device 800. Device 800 includes a processor 802. Processor 802 is connected to a volatile memory 803, such as a RAM, by a bus 808. Bus 808 also connects processor 802 and RAM 803 to a non-volatile memory 804, such as a ROM. A communications interface or module 805 is coupled to bus 808, and thus also to processor 802 and memories 803, 804. Within ROM 804 is stored a software (SW) application 807. Software application 807 may be a positioning application, although it may take some other form as well. An operating system (OS) 806 also is stored in ROM 804.

FIG. 9 is a schematic block diagram of a device 810. Device 810 may take any suitable form. Generally speaking, device 810 may comprise processing circuitry 812, including one or more processors, and a storage device 813 comprising a single memory unit or a plurality of memory units 814. Storage device 813 may store computer program instructions 817 that, when loaded into processing circuitry 812, control the operation of device 810. Generally speaking, also a module 811 of device 810 may comprise processing circuitry 812, including one or more processors, and storage device 813 comprising a single memory unit or a plurality of memory units 814. Storage device 813 may store computer program instructions 817 that, when loaded into processing circuitry 812, control the operation of module 811.

The software application 807 of FIG. 8 and the computer program instructions 817 of FIG. 9, respectively, may correspond e.g. to the computer program code in any of memories 102, 302 or 402, respectively.

Figure 10:
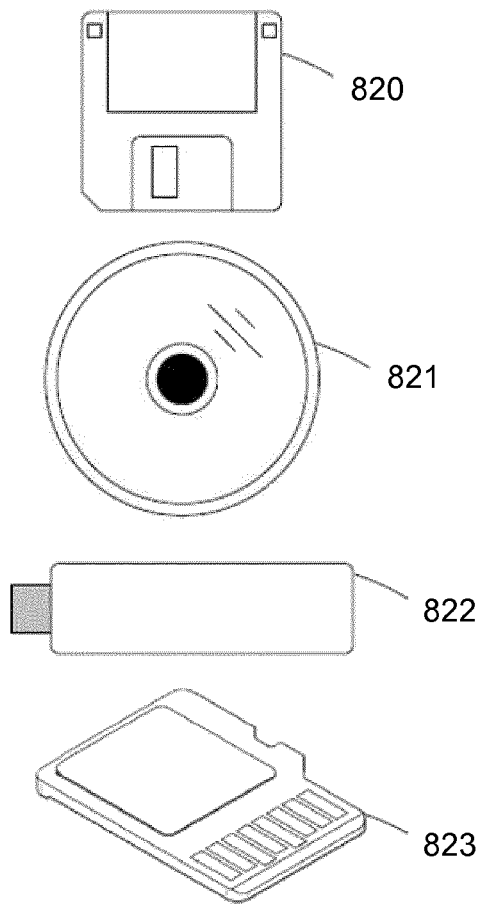
FIG. 10 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 10, which presents, from top to bottom, schematic diagrams of a magnetic disc storage 820, of an optical disc storage 821, of a semiconductor memory circuit device storage 822 and of a Micro-SD semiconductor memory card storage 823.

The functions illustrated by processor 101 in combination with memory 102, or processor 301 in combination with memory 302, or the integrated circuit 304, or processor 401 in combination with memory 402, or the chip 404 can also be viewed as means for obtaining results of measurements for a plurality of communication nodes, the measurements performed by a mobile device at a particular position on signals of the communication nodes and the measurement results for each of the communication nodes including at least a signal strength related value and an identification of the communication node; means for obtaining for at least one of the plurality of communication nodes a stored indication of a location and a stored signal strength related value associated with the stored indication of a location, and determining for the at least one communication node a difference between the signal strength related value included in the results of measurements for the at least one communication node and the stored signal strength related value obtained for the at least one communication node; means for obtaining for at least a part of the plurality of communication nodes stored radio model data, and estimating the particular position of the mobile device based on the obtained results of measurements for at least a part of the plurality of communication nodes and on the obtained stored radio model data; and means for determining a distance between the estimated particular position and a location indicated by the obtained stored indication of a location for the at least one communication node, as an indication of a health state of stored radio model data, in the case that the determined difference between the signal strength related value included in the results of measurements for the at least one communication node and the stored signal strength related value obtained for the at least one communication node falls short of a predetermined threshold.

The program codes in memories 102, 302 and 402 can also be viewed as comprising such means in the form of functional modules.

FIGS. 2, 5, 6 and 7 may also be understood to represent example functional blocks of computer program codes supporting a checking the health of radio model data.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method comprising, performed by at least one apparatus:
   obtaining results of measurements for two or more communication nodes, the measurements performed by a mobile device at a particular position on signals of the communication nodes and the measurement results for each of the communication nodes including at least a signal strength related value and an identification of the communication node;
   obtaining for at least one of the two or more communication nodes a stored indication of a location and a stored signal strength related value associated with the stored indication of a location, and determining for the at least one communication node a difference between the signal strength related value included in the results of measurements for the at least one communication node and the stored signal strength related value obtained for the at least one communication node;
   obtaining stored radio model data for a plurality of communication nodes including at least a part of the two or more communication nodes;
   estimating the particular position of the mobile device based on the obtained results of measurements for a part of the two or more communication nodes and on the obtained stored radio model data for the plurality of communication nodes; and
   dependent upon the determined difference between the signal strength related value included in the results of measurements for the at least one communication node and the stored signal strength related value obtained for the at least one communication node falling short of a predetermined threshold, identifying the at least one communication node to be eligible for health checking and also determining a distance between the estimated particular position and a location indicated by the obtained stored indication of a location for the at least one communication node, as an indication of a health state of stored radio model data.

2. The method according to claim 1, wherein the indication of a location and the signal strength related value associated with the location stored for a communication node comprise at least one of:
   an indication of a location of the communication node and an indication of a transmission power used by the communication node; and/or
   an indication of an estimated location of the communication node and an indication of one of an estimated transmission power and an estimated apparent transmission power; and/or
   an indication of a location of a measurement of a strongest received signal strength during a collection of data as a basis for a generation of the radio model data and an indication of the strongest received signal strength.

3. The method according to claim 1, wherein at least one of:
   the position is estimated based on measurement results and radio model data for communication nodes for which the measurement results include an indication of a received signal strength exceeding a threshold; and/or
   the position is estimated based on measurement results and radio model data for communication nodes excluding a communication node for which a difference between the signal strength related value included in the results of measurements for the communication node and the obtained stored signal strength related value is determined.

4. The method according to claim 1, wherein the difference between the signal strength related value included in the results of measurements and an obtained stored signal strength related value is determined only for a communication node for which the signal strength related value included in the results of measurements exceeds a predetermined threshold.

5. The method according to claim 1, further comprising at least one of:
- in the case that the determined distance exceeds a predetermined distance for the at least one communication node, generating an indication that stored radio model data for a communication node is not up to date;
- in the case that the determined distance exceeds a predetermined distance for the at least one communication node, generating an indication that stored radio model data for the at least one communication node is not up to date and causing transmission of the indication to a server;
- in the case that a determined distance for a communication node exceeds a predetermined distance, adding an identifier of the communication node to a list of communication nodes that are not to be used for positioning purposes;
- determining a mean value of a plurality of distances determined at a plurality of positions of the mobile device for a particular communication node, and adding an identifier of the communication node to a list of communication nodes that are not to be used for positioning purposes in the case that the mean value exceeds a predetermined distance;
- determining a percentage of communication nodes that are not to be used for positioning purposes, because a determined distance exceeds a predetermined distance for the communication nodes, and automatically initiating a download of new radio model data to the mobile device from a server, in case the percentage exceeds a predetermined threshold; or
- determining a percentage of communication nodes that are not to be used for positioning purposes because a determined distance for the communication nodes exceeds a predetermined distance, and generating an indication that a reliable positioning is not possible, in case the percentage exceeds a predetermined threshold.

6. The method according to claim 1, further comprising at a server:
- obtaining for a site identifiers of communication nodes that are not to be used for positioning purposes, because determined distances for the communication nodes exceed a predetermined distance;
- determining for the site a percentage of communication nodes that are not to be used for positioning purposes; and
- providing an indication to a service provider that an update of the radio model data for the site is required in case the percentage exceeds a predetermined threshold.

7. The method according to claim 1, further comprising at a server at least one of:
- receiving from a plurality of mobile devices identifiers of communication nodes detected by a respective mobile device at a particular site for which no stored radio model data is available at the respective mobile device for the particular site; and/or
- receiving from a plurality of mobile devices identifiers of communication nodes detected by a respective mobile device at a particular site for which no stored radio model data is available at the respective mobile device for the particular site, and if a percentage of communication nodes for which identifiers are received and for which no radio model data is available for the particular site exceeds a predetermined threshold, at least one of: informing a service provider and initiating a collection of data at the particular site; and/or
- receiving from a plurality of mobile devices an indication of a number of unsuccessful positioning attempts at a particular site and an indication of a number of successful positioning attempts at the particular site; and/or
- receiving from a plurality of mobile devices an indication of a number of unsuccessful positioning attempts at a particular site and an indication of a number of successful positioning attempts at the particular site, and if a percentage of unsuccessful positioning attempts at the particular site exceeds a predetermined threshold at least one of: informing a service provider and initiating a collection of data at the particular site; and/or
- receiving from a plurality of mobile devices an indication of a residual for a particular site; and/or
- receiving from a plurality of mobile devices an indication of a residual for a particular site, and in case an average of residuals received for the particular site exceeds a predetermined threshold at least one of: informing a service provider and initiating a collection of data at the particular site; and/or
- receiving an indication of a percentage of communication nodes at a particular site for which no radio model data is available for the particular site; and/or
- receiving an indication of a percentage of communication nodes at a particular site for which no radio model data is available for the particular site and at least one of: informing a service provider about the percentage, providing to a service provider an indication if the percentage exceeds a predetermined threshold, associating an indication of the percentage with radio model data that is available for the particular site, and associating an indication with radio model data that is available for the particular site if the percentage exceeds a predetermined threshold.

8. The method according to claim 1, wherein the at least one communication node comprises at least one of:
- at least one terrestrial non-cellular transmitter; and/or
- at least one access point of at least one wireless local area network; and/or
- at least one Bluetooth transmitter; and/or
- at least one Bluetooth low energy transmitter.

9. The method according to claim 1, wherein the at least one apparatus is or belongs to one of:
- the at least one mobile device; and
- a server that is configured to obtain results of measurements for a plurality of communication nodes from mobile devices.

10. The method according to claim 1, wherein estimating the particular position of the mobile device comprises excluding the obtained results of measurement for the at least one communication node that is identified to be eligible for health checking from estimation of the particular position.

11. The method according to claim 1, wherein determining the distance between the estimated particular position and the location indicated by the obtained stored indication of the location for the at least one communication node is also dependent upon identifying the at least one communication node to be eligible for health checking.

12. An apparatus comprising at least one processor and at least one memory including computer program code, the at least one memory and the computer program code configured to, with the at least one processor, cause the apparatus at least to perform:
- obtain results of measurements for two or more communication nodes, the measurements performed by a mobile device at a particular position on signals of the communication nodes and the measurement results for each of the communication nodes including at least a signal strength related value and an identification of the communication node;

obtain for at least one of the two or more communication nodes a stored indication of a location and a stored signal strength related value associated with the stored indication of a location, and determine for the at least one communication node a difference between the signal strength related value included in the results of measurements for the at least one communication node and the stored signal strength related value obtained for the at least one communication node;

obtain stored radio model data for a plurality of communication nodes including at least a part of the two or more communication nodes;

estimate the particular position of the mobile device based on the obtained results of measurements for part of the two or more communication nodes and on the obtained stored radio model data for the plurality of communication nodes; and dependent upon the determined difference between the signal strength related value included in the results of measurements for the at least one communication node and the stored signal strength related value obtained for the at least one communication node falling short of a predetermined threshold, identify the at least one communication node to be eligible for health checking and also determine a distance between the estimated particular position and a location indicated by the obtained stored indication of a location for the at least one communication node, as an indication of a health state of stored radio model data.

13. The apparatus according to claim 12, wherein the indication of a location and the signal strength related value associated with the location stored for a communication node comprise at least one of:

an indication of a location of the communication node and an indication of a transmission power used by the communication node; and/or an indication of an estimated location of the communication node and an indication of one of an estimated transmission power and an estimated apparent transmission power; and/or an indication of a location of a measurement of a strongest received signal strength during a collection of data as a basis for a generation of the radio model data and an indication of the strongest received signal strength.

14. The apparatus according to claim 12, wherein the at least one memory and the computer program code are configured to, with the at least one processor, cause the apparatus to at least one of:

estimate the position based on measurement results and radio model data for communication nodes for which the measurement results include an indication of a received signal strength exceeding a threshold; and/or estimate the position based on measurement results and radio model data for communication nodes excluding a communication node for which a difference between the signal strength related value included in the results of measurements for the communication node and the obtained stored signal strength related value is determined.

15. The apparatus according to claim 12, wherein the at least one memory and the computer program code are configured to, with the at least one processor, cause the apparatus to determine the difference between the signal strength related value included in the results of measurements and an obtained stored signal strength related value only for a communication node for which the signal strength related value included in the results of measurements exceeds a predetermined threshold.

16. The apparatus according to claim 12, wherein the at least one memory and the computer program code are configured to, with the at least one processor, cause the apparatus to perform at least one of the following:

in the case that the determined distance exceeds a predetermined distance for the at least one communication node, generate an indication that stored radio model data for a communication node is not up to date;

in the case that the determined distance exceeds a predetermined distance for the at least one communication node, generate an indication that stored radio model data for the at least one communication node is not up to date and causing transmission of the indication to a server;

in the case that a determined distance for a communication node exceeds a predetermined distance, add an identifier of the communication node to a list of communication nodes that are not to be used for positioning purposes;

determine a mean value of a plurality of distances determined at a plurality of positions of the mobile device for a particular communication node, and add an identifier of the communication node to a list of communication nodes that are not to be used for positioning purposes in the case that the mean value exceeds a predetermined distance;

determine a percentage of communication nodes that are not to be used for positioning purposes, because a determined distance exceeds a predetermined distance for the communication nodes, and automatically initiate a download of new radio model data to the mobile device from a server, in case the percentage exceeds a predetermined threshold; or determine a percentage of communication nodes that are not to be used for positioning purposes because a determined distance for the communication nodes exceeds a predetermined distance, and generate an indication that a reliable positioning is not possible, in case the percentage exceeds a predetermined threshold.

17. The apparatus according to claim 12, wherein the at least one memory and the computer program code are configured to, with the at least one processor, cause the apparatus to perform the following:

obtain for a site identifiers of communication nodes that are not to be used for positioning purposes, because determined distances for the communication nodes exceed a predetermined distance;

determine for the site a percentage of communication nodes that are not to be used for positioning purposes; and provide an indication to a service provider that an update of the radio model data for the site is required in case the percentage exceeds a predetermined threshold.

18. The apparatus according to claim 12, wherein the apparatus is or belongs to a server, and wherein the at least one memory and the computer program code are configured to, with the at least one processor, cause the server to perform at least one of:

receive from a plurality of mobile devices identifiers of communication nodes detected by a respective mobile device at a particular site for which no stored radio model data is available at the respective mobile device for the particular site; and/or receive from a plurality of mobile devices identifiers of communication nodes detected by a respective mobile device at a particular site for which no stored radio model data is available at the respective mobile device for the particular site, and if a percentage of communication nodes for which identifiers are received and for which no radio model data is available for the particular site exceeds a predetermined threshold, at least one of: inform a service provider and initiate a collection of data at the particular site; and/or receive from a plurality of mobile devices an indication of a number of unsuccessful positioning attempts at a particular site and an indication of a number of successful positioning attempts at the particular site; and/or receive from a plurality of mobile devices an indication of a number of unsuccessful positioning attempts at a particular site and an indication of a number of successful positioning attempts at the particular site, and if a percentage of unsuccessful positioning attempts at the particular site exceeds a predetermined threshold at least one of: inform a service provider and initiate a collection of data at the particular site; and/or receive from a plurality of mobile devices an indication of a residual for a particular site; and/or receive from a plurality of mobile devices an indication of a residual for a particular site, and in case an average of residuals received for the particular site exceeds a predetermined threshold at least one of: inform a service provider and initiate a collection of data at the particular site; and/or receive an indication of a percentage of communication nodes at a particular site for which no radio model data is available for the particular site; and/or receive an indication of a percentage of communication nodes at a particular site for which no radio model data is available for the particular site and at least one of: inform a service provider about the percentage, provide to a service provider an indication if the percentage exceeds a predetermined threshold, associate an indication of the percentage with radio model data that is available for the particular site, and associate an indication with radio model data that is available for the particular site if the percentage exceeds a predetermined threshold.

19. The apparatus according to claim 12, wherein the at least one communication node comprises at least one of:
at least one terrestrial non-cellular transmitter; and/or
at least one access point of at least one wireless local area network; and/or
at least one Bluetooth transmitter; and/or
at least one Bluetooth low energy transmitter.

20. The apparatus according to claim 12, wherein the apparatus is one of:
a chip;
a module for a server;
a server;
a module for a mobile device; and
a mobile device.

21. A computer readable storage medium in which computer program code is stored, the computer program code causing an apparatus to perform the following when executed by a processor:
obtain results of measurements for two or more communication nodes, the measurements performed by a mobile device at a particular position on signals of the communication nodes and the measurement results for each of the communication nodes including at least a signal strength related value and an identification of the communication node;
obtain for at least one of the two or more communication nodes a stored indication of a location and a stored signal strength related value associated with the stored indication of a location, and determine for the at least one communication node a difference between the signal strength related value included in the results of measurements for the at least one communication node and the stored signal strength related value obtained for the at least one communication node;
obtain stored radio model data for a plurality of communication nodes including at least a part of the two or more communication nodes;
estimate the particular position of the mobile device based on the obtained results of measurements for a part of the two or more communication nodes and on the obtained stored radio model data for the plurality of communication nodes; and
dependent upon the determined difference between the signal strength related value included in the results of measurements for the at least one communication node and the stored signal strength related value obtained for the at least one communication node falling short of a predetermined threshold, identify the at least one communication node to be eligible for health checking and also determine a distance between the estimated particular position and a location indicated by the obtained stored indication of a location for the at least one communication node, as an indication of a health state of stored radio model data.

* * * * *